US008688057B2

(12) United States Patent
Brand

(10) Patent No.: US 8,688,057 B2
(45) Date of Patent: Apr. 1, 2014

(54) FOOD/DRINK CONTAINER

(76) Inventor: Erez Brand, Tel Aviv (IL)

( * ) Notice: Subject to any disclaimer, the term of this patent is extended or adjusted under 35 U.S.C. 154(b) by 877 days.

(21) Appl. No.: 12/577,759

(22) Filed: Oct. 13, 2009

(65) Prior Publication Data

US 2010/0025267 A1 Feb. 4, 2010

Related U.S. Application Data

(63) Continuation-in-part of application No. 10/485,731, filed as application No. PCT/IL02/00615 on Jul. 25, 2002, now Pat. No. 7,613,431.

(30) Foreign Application Priority Data

Aug. 6, 2001 (IL) ........................................ 144749

(51) Int. Cl.
*H04B 1/38* (2006.01)

(52) U.S. Cl.
USPC ........................ 455/90.3; 455/344; 455/556.1

(58) Field of Classification Search
USPC ......... 455/90.2, 90.3, 575.1, 344, 347, 550.1, 455/556.1; 206/217, 232, 457, 459.1, 206/459.5; 340/384.1, 384.7, 691.1, 691.6, 340/692, 693.5
See application file for complete search history.

(56) References Cited

U.S. PATENT DOCUMENTS

| | | | |
|---|---|---|---|
| 5,023,706 | A | 6/1991 | Sandberg |
| 5,130,696 | A | 7/1992 | Liebman |
| 5,575,383 | A | 11/1996 | Seeley |
| 5,979,175 | A | 11/1999 | Ellison |
| 6,084,526 | A | 7/2000 | Blotky et al. |
| 6,140,932 | A | 10/2000 | Frank et al. |
| 6,742,673 | B2 | 6/2004 | Credle et al. |
| 2003/0122730 | A1 | 7/2003 | Frank et al. |

FOREIGN PATENT DOCUMENTS

JP 2001290887 A * 10/2001

* cited by examiner

*Primary Examiner* — Quochien B Vuong
(74) *Attorney, Agent, or Firm* — Browdy and Neimark, PLLC

(57) ABSTRACT

The present invention relates to the field of food/drink containers and multimedia systems. More specifically, the present invention relates to a combination of a food/drink container. The present invention provides the user an immediate multimedia/communications sources while using the container wherein the container includes a body for accommodating food/drink, a closure for closing the container and a communications/multimedia module.

37 Claims, 8 Drawing Sheets

FOOD/DRINK CONTAINER

CROSS-REFERENCE TO RELATED APPLICATIONS

This application is a continuation in part (CIP) of U.S. patent application Ser. No. 10/485,731, which is the U.S. National Phase Application under 35 U.S.C. 371 of PCT International Application No. PCT/IL02/00615, which has an international filing date of Jul. 25, 2002, and which claims priority from Israel Patent Application No. 144,749, filed Aug. 6, 2001, each of which is expressly incorporated herein in its entirety by reference thereto.

FIELD OF THE INVENTION

The present invention relates to the field of food/drink containers and multimedia systems. More specifically, the present invention relates to a combination of a food/drink container with a multimedia system.

BACKGROUND OF THE INVENTION

Entertainment methods are widely used for promoting sales of products, especially to promote children food packages. These entertainment methods include adding toys and games to some products, getting the user to participate the user in collecting-games or lottery-games and many other methods.

The present invention provides the user an immediate entertainment source while he consumes the product. The present invention provides a container with a combination of a multimedia module with a product, this multimedia module designed to be operate while the content of the container is consumed.

SUMMARY OF THE INVENTION

The present invention relates to food/drink containers. More specifically, the present invention relates to food/drink containers combined with audio and video capabilities for inducing eating habits as well as for recreational purposes. Hereinafter the term “multimedia” shall include any sound, audio, video, music and the like.

Hereinafter the term “multimedia module” shall include any multimedia system and/or equipment capable of producing sound, audio, video, music and the like.

Hereinafter the term “fuel reservoir” shall include but will not be limited to a natural or artificial source, storage or collection of fuel and/or energy, a receptacle or chamber for holding a fuel and/or energy sources or a large or extra supply, reserve or stock of a source of energy.

According to the teachings of the present invention there is provided, a food/drink container comprising: (a) a closure for closing the container, and (b) a multimedia module responsive to opening the container, the multimedia module including: a speaker, and a projecting unit for projecting an image or a movie viewable from the outside the container.

According to further embodiments of the present invention the food/drink container further includes a personal viewer for readily facilitating viewing the image or movie by a single user.

According to further embodiments of the present invention the food/drink container further including an IR port for receiving commands from a wireless remote control.

According yet further embodiments of the present invention the food/drink container farther including a screen for displaying the image or movie.

According to still further embodiments of the present invention the food/drink container further including a cellular module, the cellular module including: (a) a microphone for readily facilitating two-way conversation utilizing the cellular module, and (b) an earphone for readily facilitating two-way conversation utilizing the cellular module.

According to further embodiments of the present invention, the container further including a sensor responsive to the closure being partially or totally opened.

According to further teachings of the present invention there is provided, a food/drink container including: (a) a closure for closing the container, and (b) a radio responsive to opening the container, the radio including a speaker for facilitating output of sound.

According to further embodiments of the present invention, the food/drink container further including an earphone jack for readily accommodating an earphone plug, thereby readily facilitating a user to use earphones with the radio.

According to still further embodiments of the present invention, the food/drink container further including an IR port for receiving commands from a wireless remote control.

According to yet further embodiments of the present invention, the food/drink container further including a cellular module, the cellular module including: (a) a microphone for readily facilitating two-way conversation utilizing the cellular module, and (b) an earphone for readily facilitating two-way conversation utilizing the cellular module.

According to further embodiments of the present invention, the food/drink container further including a sensor responsive to the closure being partially or totally opened.

According to yet further embodiments of the present invention, the sensor is a sensor sensitive to light such that the sensor is responsive to light entering the container subsequently to the closure being partially or totally removed.

According to further embodiments of the present invention, the food/drink container further including an electrical circuit connected to a power source, such that the power source provides power to a sensor responsive to the closure being opened.

According to further teachings of the present invention there is provided, a food/drink container including: (a) a semi flexible floor (b) a closure for closing the container, (c) a multimedia module responsive to opening the container, the multimedia module including: (i) a speaker, and (ii) a projecting unit for projecting an image viewable from the outside the container, and (d) a switch responsive to a spoon being entered into the container and displacing the semi flexible floor, such that the switch activates the multimedia module.

According to further embodiments of the present invention, the food/drink container further including a personal viewer for readily facilitating viewing the image or movie by a single user.

According to still further embodiments of the present invention, the food/drink container further including an IR port for receiving commands from a wireless remote control.

According to yet farther embodiments of the present invention, the food/drink container further including a screen for displaying the image or movie.

According to further embodiments of the present invention, the food/drink container further includes a cellular module, the cellular module including: (a) a microphone for readily facilitating two-way conversation utilizing the cellular module, and (b) an earphone for readily facilitating two-way conversation utilizing the cellular module.

According to still further teachings of the present invention there is provided, a food/drink container including: (a) a semi flexible floor, (b) a closure for closing the container, (b) a radio responsive to opening the container, the radio including a speaker for facilitating output of sound, and (c) a switch responsive to a spoon being entered into the container and displacing the semi flexible floor, such that the switch activates the radio.

According to further embodiments of the present invention, the food/drink container further including an earphone jack for readily accommodating an earphone plug, thereby readily facilitating a user to use earphones with the radio.

According to still further embodiments of the present invention, the food/drink container further includes an IR port for receiving commands from a wireless remote control.

According to yet further embodiments of the present invention, the food/drink container further including a cellular module, the cellular module including: (a) a microphone for readily facilitating two-way conversation utilizing the cellular module, and (b) an earphone for readily facilitating two-way conversation utilizing the cellular module.

According to further embodiments of the present invention, the food/drink container further including an electrical circuit connected to a power source, such that the power source provides power to the switch and the cellular module.

According to yet further teachings of the present invention there is provided, a food/drink container including: (a) a closure for closing the container, and (b) an audio device for playing music, which audio device is responsive to opening the container, the audio device module including a speaker.

According to further embodiments of the present invention, the food/drink container further including an earphone for readily facilitating listening to the audio device. According to still further embodiments of the present invention, the food/drink container further including a sensor responsive to the closure being partially or totally opened.

According to yet further embodiments of the present invention, the food/drink container further including an IR port for receiving commands from a wireless remote control.

According to further teachings of the present invention there is provided a food container with a closure including: at least one sensor selected from the group consisting of: a closure sensor responsive to the closure being partially or totally opened, and an insertion sensor responsive to an article being entered into the container or displacing a semi flexible floor situated in the container, and at least one audio device responsive to the at least one sensor.

According to further embodiments of the present invention, the food container further includes at least one internet service module responsive to the at least one sensor, wherein the at least one internet service module is configured for readily connecting a mobile device to an internet service provider.

According to still further embodiments of the present invention, the at least one audio device further includes at least one of: a multimedia module including a speaker, and a radio device.

According to yet further embodiments of the present invention, the food container further includes an energy module for readily providing power to at least one of the at least one audio device or at least one the internet service module.

According to further embodiments of the present invention, the energy module is selected from the group consisting of: a chargeable battery connected to a power supply, a fuel cell chargeable by a fuel reservoir, and a solar cell array connected to a chargeable battery.

According to still further embodiments of the present invention, the food container further includes a communications module selected from the group consisting of: a cellular communication module, a satellite communication module, a Bluetooth communication module, an RF communication module, a local area network communication module an IR communication module and a wired communication module.

According to further teachings of the present invention there is provided a drink container including: a body for accommodating drink, a closure for closing the container, and a communications module.

According to further embodiments of the present invention, the communications module further includes an internet service module responsive to opening the drink container, the internet service module configured for connecting a mobile device to an internet service provider.

According to still further embodiments of the present invention, the communications module is selected from the group consisting of: a cellular communication module, a satellite communication module, a Bluetooth communication module, an RF communication module, a local area network communication module an IR communication module and a wired communication module.

According to still further embodiments of the present invention, the communications module readily facilitates communication with a remote apparatus.

According to further embodiments of the present invention, the remote apparatus is selected from the group consisting of: a computer, a PDA, a Cell phone and a vending machine.

According to still further teachings of the present invention there is provided a food/drink vending machine including: a plurality of bases for food packages, a plurality of food packages, wherein each of the food packages is associated with a base selected from the plurality of bases, at least one sensor responsive to vending at least one of the plurality of food packages, and a communications module.

According to further embodiments of the present invention, the food/drink vending machine further includes a cooling unit for controlling the temperature of the plurality of food packages.

According to still further embodiments of the present invention, the food/drink vending machine further includes a module selected from the group consisting of: a multimedia module, a radio module, a biometric module, a cellular module and an internet service modules responsive to activation of the vending machine.

According to yet further teachings of the present invention there is provided a drink dispenser for dispensing drinks to individuals, the drink dispenser including: a dispensing mechanism for readily dispensing drinks to individuals, at least one sensor responsive to activation of the drink dispenser, and a communication module selected from the group consisting of: a cellular communication module, a satellite communication module, a Bluetooth communication module, an RF communication module, a local area network communication module an IR communication module and a wired communication module.

According to further embodiments of the present invention, the dispensing mechanism further includes a water supply selected from the group consisting of: a water reservoir and a domestic water supply.

According to still further embodiments of the present invention, the drink dispenser further includes a module selected from the group consisting of: a multimedia module, a radio module, a cellular module and an internet service modules responsive to activation of the vending machine.

According to further teachings of the present invention there is provided a transport container including: a body for accommodating goods, a closure for closing the container, at least one telemetry sensor selected from the group consisting of: a temperature sensor, a humidity sensor, a motion sensor, a security sensor, and an integrity sensor, and a communications module for readily communicating readings of the telemetry sensor, the communications module selected from the group consisting of: a cellular communication module, a satellite communication module, a Bluetooth communication module, an RF communication module, a local area network communication module an IR communication module and a wired communication module.

According to further embodiments of the present invention, the transport container further includes a mechanism selected from the group consisting of: a cooling mechanism and an access control biometric mechanism.

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Hereinafter the term "multimedia" shall include any sound, audio, video, music and the like.

Hereinafter the term "multimedia module" shall include any multimedia system and/or equipment capable of producing sound, audio, video, music and the like.

Hereinafter, the term "transport container" shall include, but will not be limited to, commercial containers for the purpose of transporting by way of sea, air, rail or land as well as containers known as "20 foot containers" and "40 foot containers".

Hereinafter, the term "array" shall include, but will not be limited to, a group, a number, or a quantity of things or a functional arrangement of interrelated objects, devices, components or items of equipment.

Figure 1:
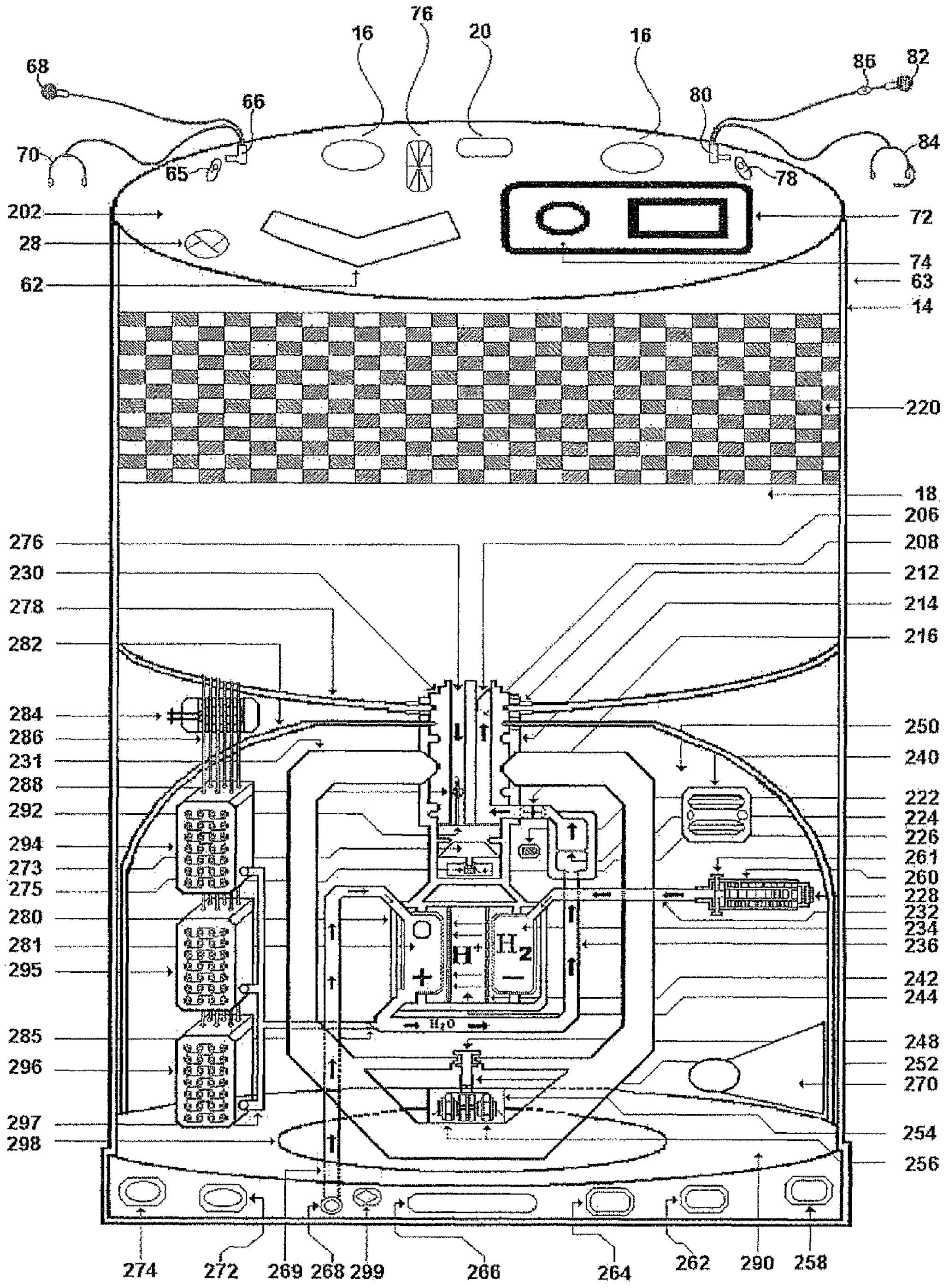
Figure 2:
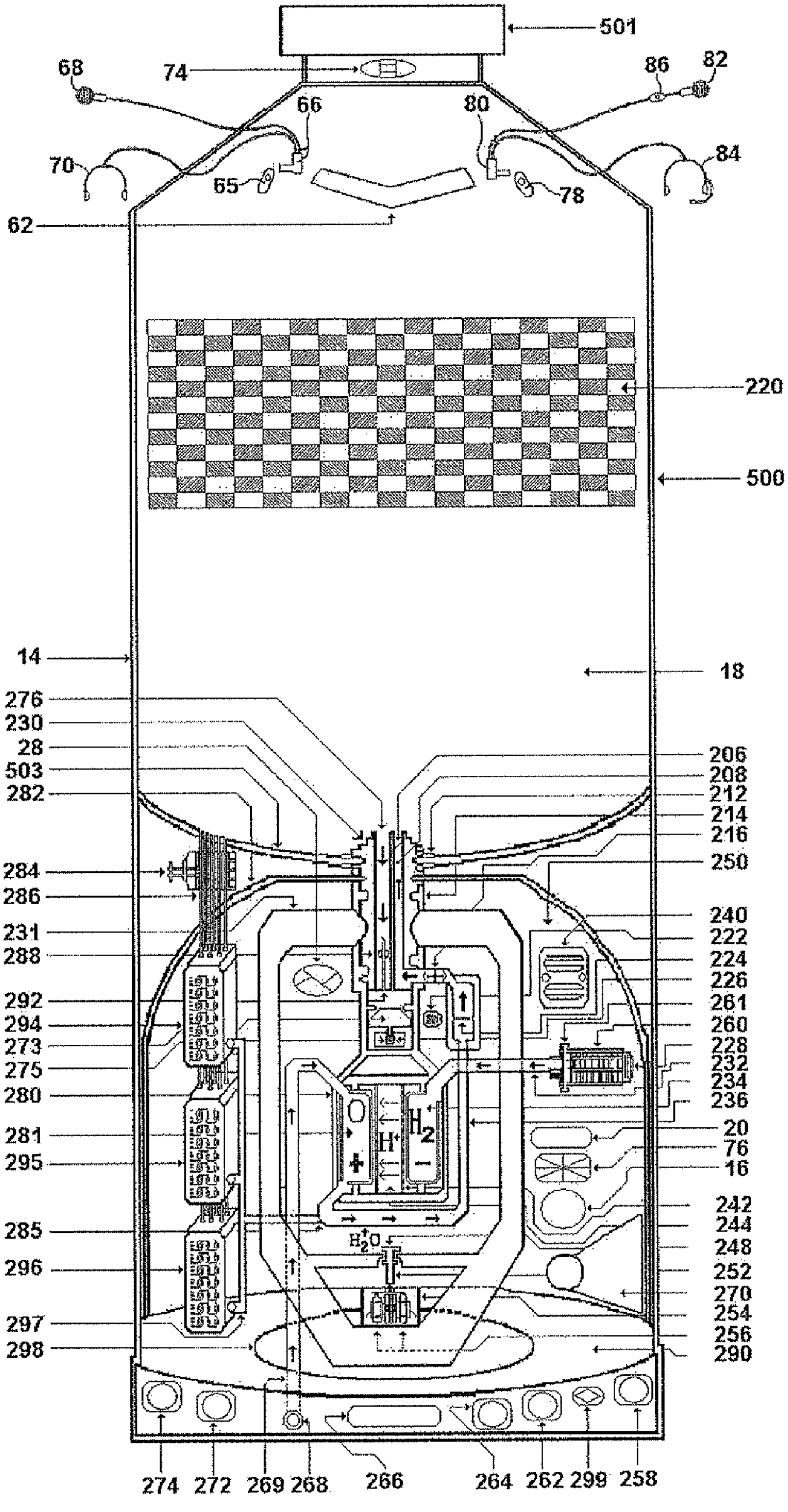
Figure 3:
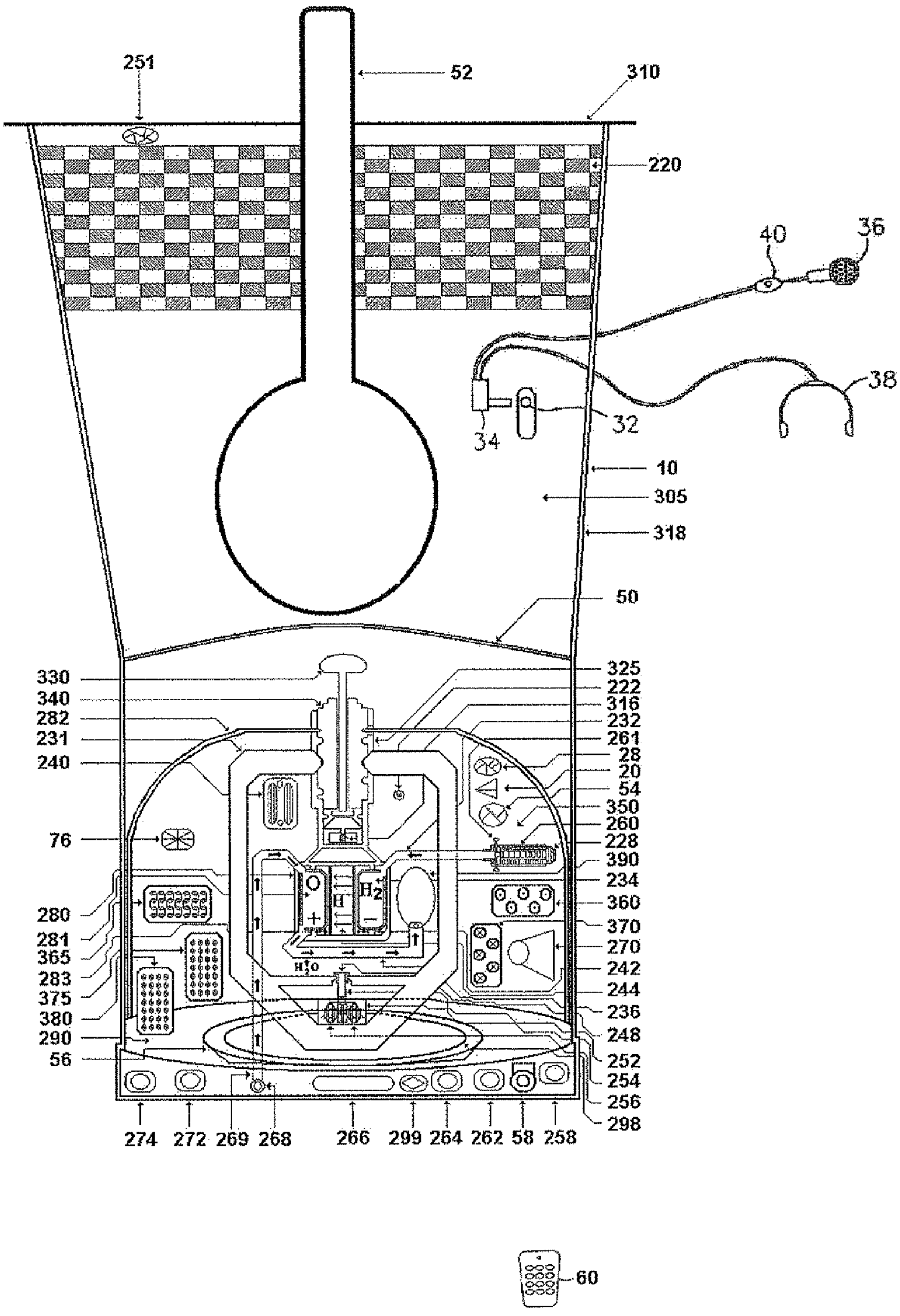
Figure 4:
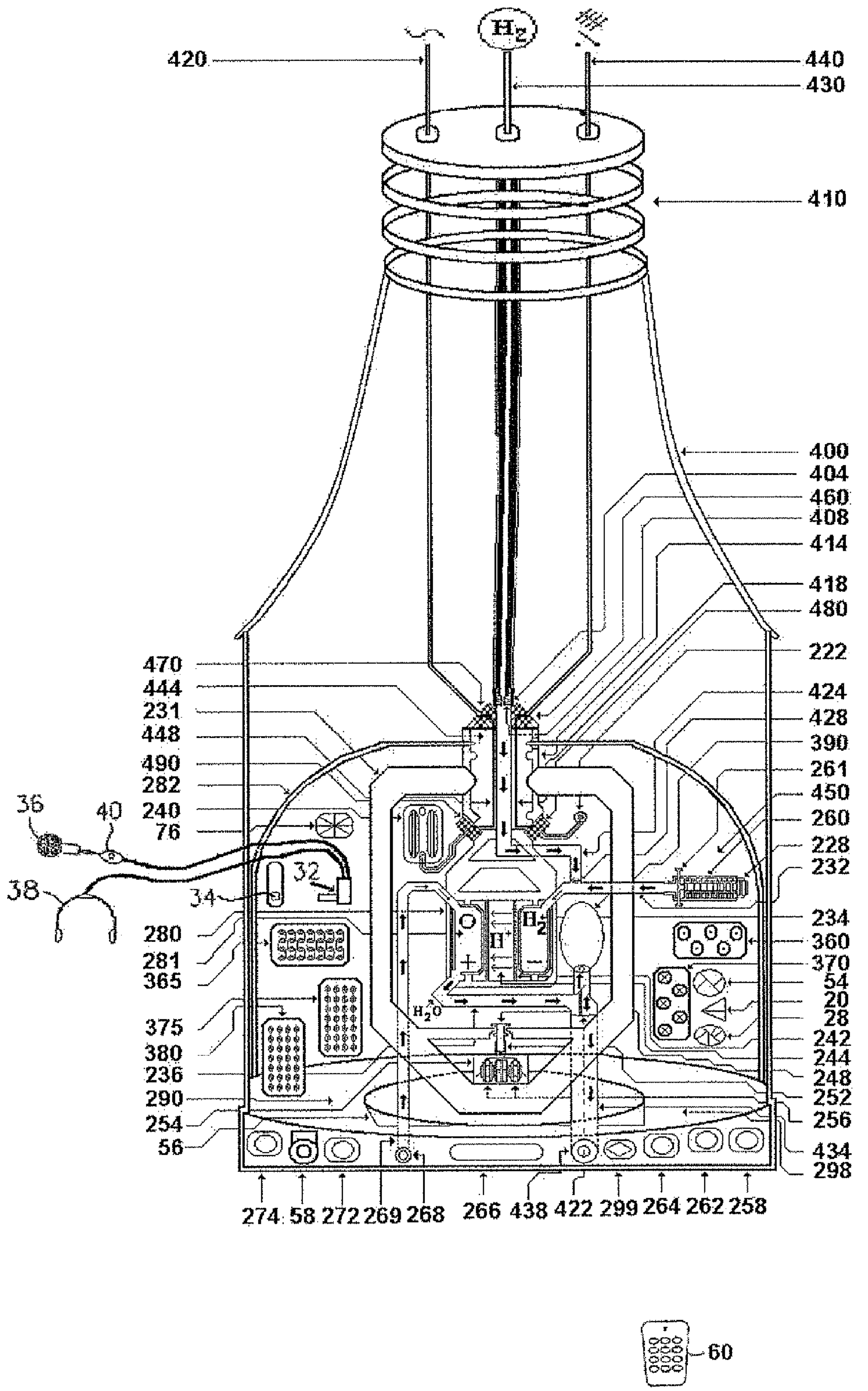
Figure 5:
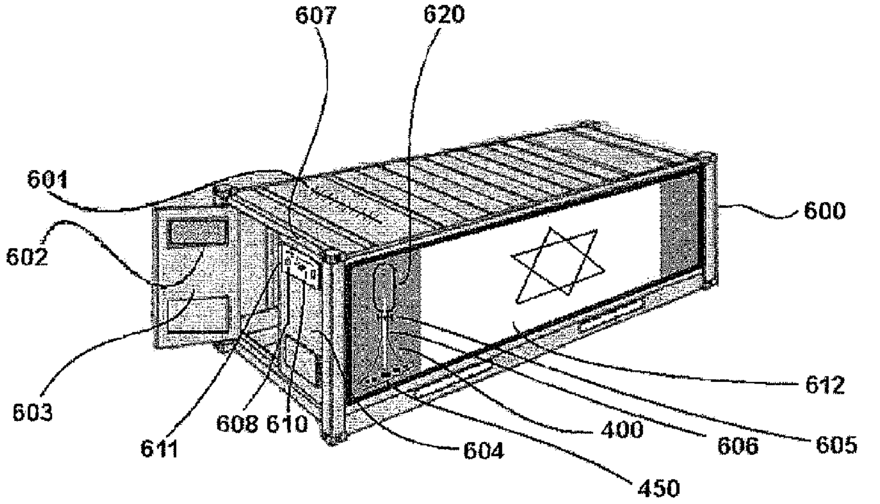
Figure 6:
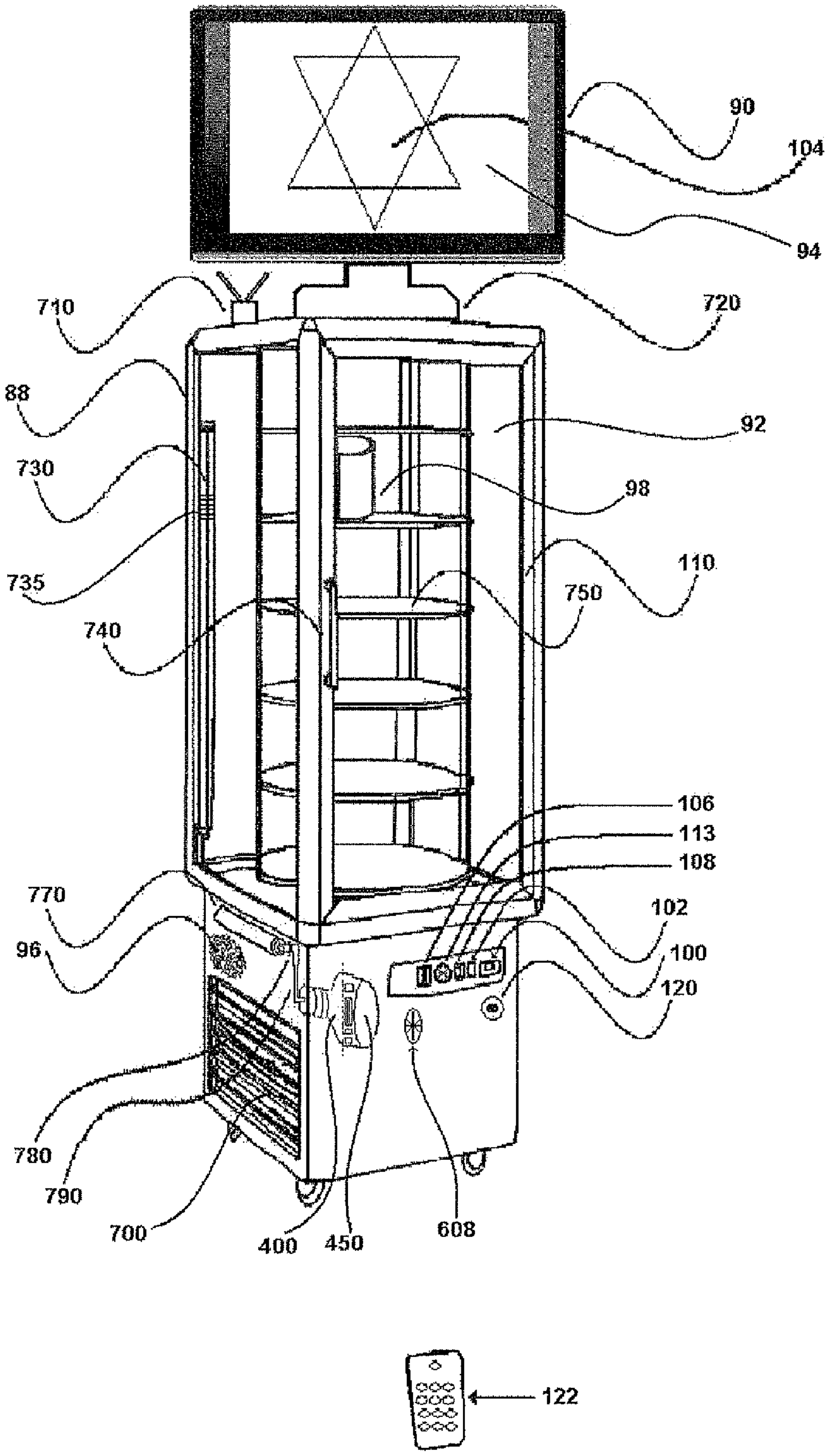
Figure 7:
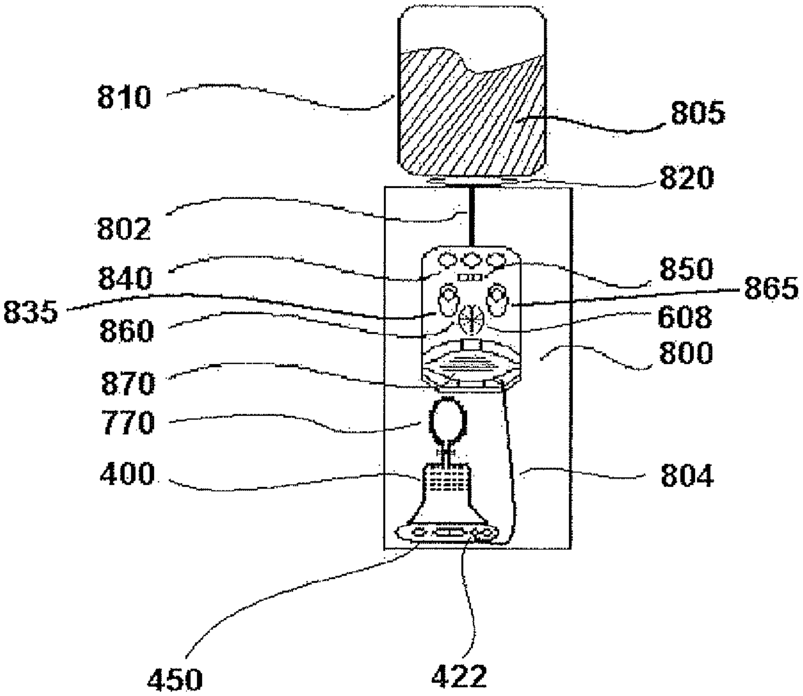

In the figures:

FIG. 1 illustrates a first drink container with a communications module;

FIG. 2 illustrates a second drink container with a communications module;

FIG. 3 illustrates a food container with an audio device responsive to a sensor;

FIG. 4 illustrates an adapter component array for use with preferred embodiments of the present invention;

FIG. 5 illustrates a transport container with a telemetry sensor;

FIG. 6 illustrates a vending machine with a communication module;

FIG. 7 illustrates a first drink dispenser with a communication module; and

Figure 8:
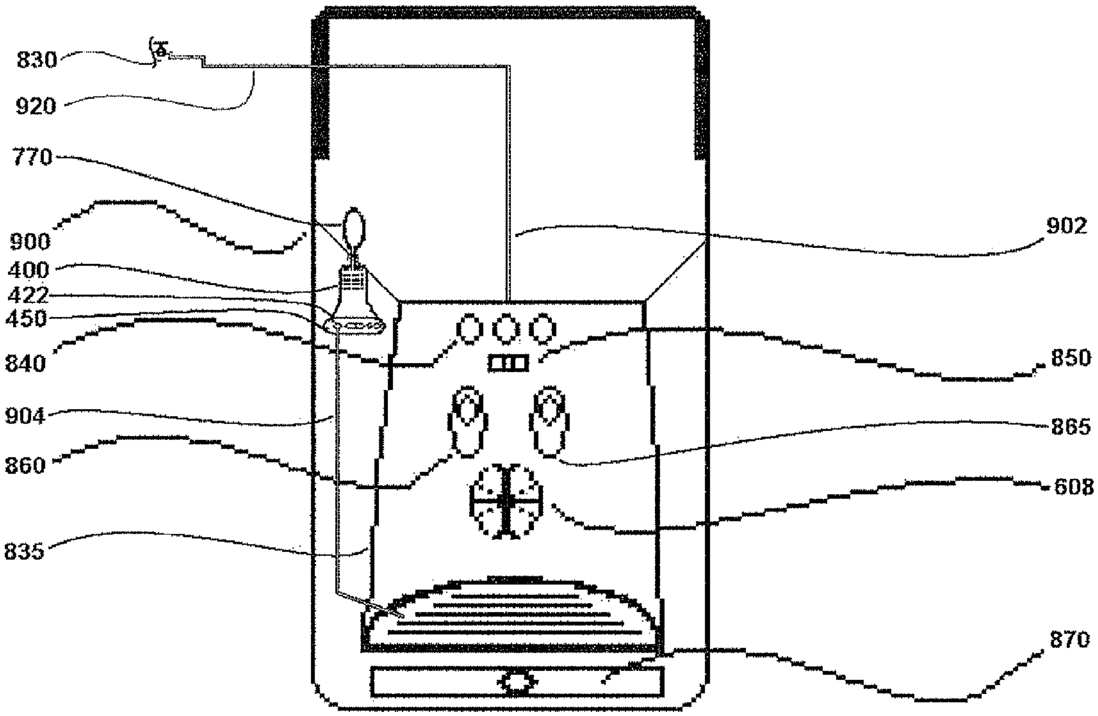

FIG. 8 illustrates a second drink dispenser with a communication module.

DESCRIPTION OF THE PREFERRED EMBODIMENTS

The present invention is a food/drink container with a multimedia module. A multimedia module is combined with a food/drink container for sounding voices and/or projecting images or movies in a predetermined condition e.g., when opening the container or when removing a label. The system can be built with the container as a common part or is produced to install with any existing food/drink container as a retrofit.

The present invention provides a food/drink container with a multimedia module for providing multimedia, sound and music and/or projecting an image or a movie from inside the container such that the image or movie are readily viewable from the exterior of the container.

The music, sound and multimedia are readily audible and/or visible to users by way of a speaker or speakers. The multimedia module preferably includes a laser or light projector for projecting images and/or movies, a speaker or speakers for sounding the music, sound and/or audio, a memory that stores the sound, multimedia and the images and movies, an electronic system for projecting the images via the projector and speakers for providing sound, audio and music capabilities, a sensor or switch for recognizing that the container is being used or/and going to be use. The invention further includes a power source for operating the system and the projected walls are made of a material facilitating viewing from the exterior of the container of images projected inside the container.

In a preferred embodiment, the food/drink container can includes either a system for reproducing music or a system for projecting movies and/or images or both.

The present invention includes a sensor or switch to recognize a predetermined condition for operating the system, as a switch or sensor to recognize opening of the container or recognize users' action in order to operate the multimedia module. The sensors can include a variety of sensors e.g., a pressure sensor for sensing the pressure of a spoon on the floor of the container or sense the users' pressure on the container walls, a sensor for sensing the removal of a label from the container, a photoelectric cell for sensing light entering the container pursuant to opening the container and/or other switches and sensors for recognizing a condition for activating the multimedia module.

The multimedia module is operated by an action of the user e.g., opening the container, removing a label and so on. In the embodiment of music only, the electronic system starts to play a music that is held in a memory and sound the music via a speaker or speakers. In the embodiment of full multimedia, the multimedia module of the present invention has a laser or light projector that project images on the inside walls, in some cases by using mirrors, and the walls are made of a material that enables these images to be seen from the outside while sounds are played via speaker. The voice and the images are stored in a memory and operated by an electronic system that includes a disposal power source.

The principles and operation of the food/drink container with a multimedia module, according to the present invention may be better understood with reference to the drawing and the accompanying description.

Referring now to the drawing, FIG. 1 illustrates a drink container 63 with a closure 202. Drink container 63 preferably includes a multimedia module 62. Preferably, drink container 63 includes an earphone jack 65 for readily accommodating an earphone plug 66 of an earphone 68 or an earphone set 70.

Preferably, drink container 63 accommodates an electronic and projecting unit 20. Preferably, drink container 63 includes at least one speaker 16 (two speakers 16 are shown in FIG. 1). When the user uses an opener 72 to open drink container 63, the opening of drink container 63 is sensed by a sensor 74 and operates electronic and projecting unit 20. Optionally, a control module 295 uses images and sounds that are held in memory unit 296 to project images on a wall 14 of drink container 63 and sound voices via speakers 16 for a period of time.

Preferably, control module 295 is electronically attached to or integrally formed with a radio device 28 facilitating a user to listen to radio device 28 at will.

Preferably, radio device 28 is preset to a given station according to the intended consumers of drink 18 contained in drink container 63. Preferably, drink container 63 includes a cellular module 76 for readily facilitating a user to use drink container 63 as a cellular phone pre-charged with a predetermined value of calls. Thus, cellular module 76 can utilize an earphone jack 78 for readily accommodating an earphone plug 80, which earphone plug 80 is attached to, or integrally formed with an earphone 82 or earphone set 84. Preferably earphone 82 or earphone set 84 includes or is integrally formed with a microphone 86 for readily facilitating two-way conversations with cellular module 76.

Preferably, drink container 63 includes an array of photoelectric cells 220 for readily generating power for drink container 63.

Preferably control module 295 controls cellular module 76.

Preferably, drink container 63 includes a component array 250. Component array 250 includes a drink conduit 230 for readily facilitating flow of drink 18 and/or activation of components within component array 250.

Drink conduit 230 includes an inflow duct 276 for readily facilitating flow of drink 18 subsequently to opening of closure 202. Drink conduit 230 also preferably includes an outflow duct 208 for readily facilitating flow of liquids into drink container 63.

Outflow duct includes a unidirectional flow control 206 for preventing drink 18 from entering component array through outflow duct 208.

Preferably, a purification filter 224 purifies liquids flowing through outflow duct 208 into drink 18.

For the purpose of sealing drink conduit 230 to a bottom 278 of drink container 63, drink container 63 further includes a sealer 212.

Drink conduit 230 is preferably secured to drink container 63 by way of a conduit securer 214.

Optionally, outflow of liquids through outflow duct 208 is enhanced by a liquid pump 216. Liquid pump 216 is powered by a power supply selected from the group consisting of: a main power supply 240, a fuel cell 280 and photo electric array 220.

Optionally, a fiber optic controller 222 is configured to fiber optically control at least one component of component array 250.

An activator 226 is activated subsequent to opening drink container 63 with opener 72.

Optionally, drink 18 is carbonated and thus a pressure larger than one atmosphere is created in drink container 63. Subsequently to opening drink container 63 with opener 72, pressure in drink container 63 drops to the same pressure as the surrounding environment.

Thus, the pressure reduction reduces the pressure applied by drink 18 on activator 226 and bias 275 displaces displacement element 273 thereby activating activator 226. Preferably, activator 226 is selected from the group consisting of: a pressure switch, an electrical switch, an electronic switch, a mechanical switch and an acoustic switch.

Optionally, for the purpose of preventing flow of drink 18 out of drink container 63 a seal 288 is attached to or integrally formed with drink conduit 230.

A seal breaker 292 is attached to, or integrally formed with component array 250 such that attaching component array 250 to drink container 63 breaches seal 288 and readily facilitates of drink 18 into drink conduit 230.

Preferably, component array 250 includes a compressed hydrogen container 260 for readily providing hydrogen to fuel cell 280 by way of a gas pipe 232. Preferably, conduit securer 214 readily secures fuel cell 280 and aligns inflow duct 206 and outflow duct 208.

A pressure valve 261 is attached to, or integrally formed with, compressed hydrogen container 260 for readily controlling the pressure and/or quantities of hydrogen flowing from hydrogen container 260 to fuel cell 280.

Optionally, a hydrogen container securing element 228 is provided for securing hydrogen container 260 to component array 250.

Fuel cell 280 is geared towards an electrochemical conversion. Fuel cell 280 preferably produces electricity from fuel on an anode side 234 and an oxidant on a cathode side 281, which react in the presence of an electrolyte 244. The reactants flow into fuel cell 280, and the reaction products flow out of fuel cell 280 by way of flow pipe 236, while electrolyte 244 remains within fuel cell 280. Fuel cell 280 preferably operates substantially continuously as long as the flow to anode side 234 and cathode side 281 is maintained.

Fuel cell 280 is selected from the group consisting of an electrochemical cell, at least one battery which at least one battery consumes a reactant from an external source, which must be replenished, a thermodynamically open system, at least one battery storing electrical energy chemically and a thermodynamically closed system.

Preferably and as shown in FIG. 1, fuel cell 280 is a hydrogen fuel cell including hydrogen as its fuel and oxygen from air as its oxidant. Hydrogen flows from hydrogen container 260 to anode side 234 and comes into contact with oxygen flowing from air flowing from outside drink container 63 through a filtered aperture 268 formed in drink container 63. Air flowing from filtered aperture 268 formed in drink container 63 travels through air pipe 269 to cathode side 281, thereby providing the oxygen as the oxidant.

Alternatively and by way of example only, other usable fuels instead of hydrogen include hydrocarbons and alcohols. By way of example only, other oxidants can include chlorine and chlorine dioxide.

Optionally, a catalyst 242 is situated between anode side 234 and cathode side 281.

Preferably, drink container 63 includes a component array closure 290. Preferably, component array closure 290 is secured to drink container by locking mechanism 254. Locking mechanism 254 is geared toward securing and locking component array closure 290 to drink container 63. Preferably, component array closure 290 is readily removable by the manufacturer or filler of drink 18 for the purpose of access, refueling fuel cell 280 and maintenance of component array 250.

By way of an example only, an electromechanical solenoid 252 includes an electromagnetically inductive coil 256, wound around a displaceable armature 248. Electromagnetically inductive coil 256 is shaped such that displaceable armature 248 is readily displaced in and out of the center of electromechanical solenoid 252, altering inductance of electromagnetically inductive coil 256 and thereby becoming an electromagnet. Displaceable armature 248 is geared towards providing a mechanical force to locking mechanism 254.

The force applied to displaceable armature 248 is proportional to the change in inductance of electromagnetically inductive coil 256 with respect to the change in position of displaceable armature 248, and the current flowing through electromagnetically inductive coil 256. The force applied to displaceable armature 248 will displace displaceable armature 248 in a direction that increases the inductance of electromagnetically inductive coil 256.

Component array 250 preferably includes an antenna 270 for transceiving responsively to cellular module 76.

For the purpose of enhancing output and reception levels, antenna 270 is preferably a directional antenna or a horn antenna.

Component array 250 preferably includes at least one interface selected from the group consisting of: a USB interface 258, a PDA interface 262, a cellular interface 264, a memory card interface 266, a computer interface 272 and a control interface 274.

Component array 250 preferably includes a photographic module 299 geared towards capturing still images, clips and video images.

Component array 250 preferably includes an omni-directional antenna 298 for low power transmission.

Component array preferably utilizes drink 18 for cooling at least one component of component array 250.

Drink 18 flows through a cooling mechanism 286. Preferably a valve mechanism 284 controls the flow of drink 18 through cooling mechanism 286.

Cooling mechanism is geared towards cooling a management module 294, control module 295 and memory unit 296. A cooling exit 297 readily facilitates flow of drink 18 subsequent to drink 18 cooling at least one component of component array 250.

Preferably, a unidirectional valve 285 connects cooling exit 297 and facilitates flow of drink 18 from cooling exit 297 into flow pipe 236.

Preferably, component array 250 is secured to drink container 63 by way of a locking mechanism 231. Locking mechanism 231 is geared towards fitting, replacing and/or recycling, maintenance and re-use of component array 250 in additional drink containers 63.

Management module 294 preferably manages and controls energy consumption of component array 250.

Optionally memory unit 296 is a "flash" memory unit.

For the purpose of sealing an upper surface 282 of component array 250, drink container 63 further includes a drink conduit 230. Drink conduit 230 is preferably secured to drink container 63 by way of a conduit securer 214.

FIG. 2 illustrates a bottled drink container 500. Preferably bottled drink container 500 includes a bottle closure 501. Like above, bottled drink container 500 preferably includes a multimedia module 62. Preferably, bottled drink container 500 includes an earphone jack 65 for readily accommodating an earphone plug 66 of an earphone 68 or an earphone set 70.

Preferably, bottled drink container 500 accommodates an electronic and projecting unit 20. Preferably, bottled drink container 500 includes at least one speaker 16. When the user uses opens bottle closure 501, the opening of bottled drink container 500 is sensed by a sensor 74 and operates electronic and projecting unit 20. Optionally, a control module 295 uses images and sounds that are held in memory unit 296 to project images on a wall 14 of bottled drink container 500 and sound voices via speaker 16 for a period of time.

Preferably, control module 295 is electronically attached to or integrally formed with a radio device 28 facilitating a user to listen to radio device 28 at will.

Preferably, radio device 28 is preset to a given station according to the intended consumers of drink 18 contained in bottled drink container 500. Preferably, bottled drink container 500 includes a cellular module 76 for readily facilitating a user to use bottled drink container 500 as a cellular phone pre-charged with a predetermined value of calls. Thus, cellular module 76 can utilize an earphone jack 78 for readily accommodating an earphone plug 80, which earphone plug 80 is attached to, or integrally formed with an earphone 82 or earphone set 84. Preferably earphone 82 or earphone set 84 includes or is integrally formed with a microphone 86 for readily facilitating two-way conversations with cellular module 76.

Preferably, bottled drink container 500 includes an array of photo-electric cells 220 for readily generating power for bottled drink container 500.

Preferably control module 295 controls cellular module 76.

Preferably, bottled drink container 500 includes a component array 250. Component array 250 includes a drink conduit 230 for readily facilitating flow of drink 18 and/or activation of components within component array 250.

For the purpose of sealing an upper surface 282 of component array 250, drink conduit 230 is preferably secured to bottled drink container 500 by way of a conduit securer 214.

Similarly, drink conduit 230 includes an inflow duct 276 for readily facilitating flow of drink 18 subsequently to opening of bottle closure 501. Drink conduit 230 also preferably includes an outflow duct 208 for readily facilitating flow of liquids into bottled drink container 500.

Outflow duct includes a unidirectional flow control 206 for preventing drink 18 from entering component array through outflow duct 208.

Preferably, a purification filter 224 purifies liquids flowing through outflow duct 208 into drink 18.

For the purpose of sealing drink conduit 230 to a bottle bottom 503 of bottled drink container 500, bottled drink container 500 further includes a sealer 212.

Drink conduit 230 is preferably secured to bottled drink container 500 by way of a conduit securer 214.

Optionally, outflow of liquids through outflow duct 208 is enhanced by a liquid pump 216. Liquid pump 216 is powered by a power supply selected from the group consisting of: a main power supply 240, a fuel cell 280 and photo electric array 220.

Optionally, a fiber optic controller 222 is configured to fiber optically control at least one component of component array 250.

An activator 226 is activated subsequent to opening bottled drink container 500 with bottle closure 501.

Optionally, drink 18 is carbonated and thus a pressure larger than one atmosphere is created in bottled drink container 500. Subsequently to opening bottled drink container 500, pressure in bottled drink container 500 drops to the same pressure as the surrounding environment.

Thus, the pressure reduction reduces the pressure applied by drink 18 on activator 226 and bias 275 displaces displacement element 273 thereby activating activator 226. Preferably, activator 226 is selected from the group consisting of: a pressure switch, an electrical switch, an electronic switch, a mechanical switch and an acoustic switch.

Optionally, for the purpose of preventing flow of drink 18 out of bottled drink container 500 a seal 288 is attached to or integrally formed with drink conduit 230.

A seal breaker 292 is attached to, or integrally formed with component array 250 such that attaching component array 250 to bottled drink container 500 breaches seal 288 and readily facilitates of drink 18 into drink conduit 230.

Preferably, component array 250 includes a compressed hydrogen container 260 for readily providing hydrogen to fuel cell 280 by way of a gas pipe 232. Preferably, conduit securer 214 readily secures fuel cell 280 and aligns inflow duct 206 and outflow duct 208.

A pressure valve 261 is attached to, or integrally formed with, compressed hydrogen container 260 for readily controlling the pressure and/or quantities of hydrogen flowing from hydrogen container 260 to fuel cell 280.

Optionally, a hydrogen container securing element 228 is provided for securing hydrogen container 260 to component array 250.

Fuel cell 280 is geared towards an electrochemical conversion. Fuel cell 280 preferably produces electricity from fuel on an anode side 234 and an oxidant on a cathode side 281, which react in the presence of an electrolyte 244. The reactants flow into fuel cell 280, and the reaction products flow out of fuel cell 280 by way of flow pipe 236, while electrolyte 244 remains within fuel cell 280. Fuel cell 280 preferably operates substantially continuously as long as the flow to anode side 234 and cathode side 281 is maintained.

Fuel cell 280 is selected from the group consisting of an electrochemical cell, at least one battery which at least one battery consumes a reactant from an external source, which must be replenished, a thermodynamically open system, at least one battery storing electrical energy chemically and a thermodynamically closed system.

Preferably and as shown in FIG. 2, fuel cell 280 is a hydrogen fuel cell including hydrogen as its fuel and oxygen from air as its oxidant. Hydrogen flows from hydrogen container 260 to anode side 234 and comes into contact with oxygen flowing from air flowing from outside bottled drink container 500 through a filtered aperture 268 formed in bottled drink container 500. Air flowing from filtered aperture 268 formed in bottled drink container 500 travels through air pipe 269 to cathode side 281, thereby providing the oxygen as the oxidant.

Alternatively and by way of example only, other usable fuels instead of hydrogen include hydrocarbons and alcohols. By way of example only, other oxidants can include chlorine and chlorine dioxide.

Optionally, a catalyst 242 is situated between anode side 234 and cathode side 281.

Preferably, bottled drink container 500 includes a component array closure 290. Preferably, component array closure 290 is secured to drink container by locking mechanism 254. Locking mechanism 254 is geared toward securing and locking component array closure 290 to bottled drink container 500. Preferably, component array closure 290 is readily removable by the manufacturer or filler of drink 18 for the purpose of access, refueling fuel cell 280 and maintenance of component array 250.

By way of an example only, an electromechanical solenoid 252 includes an electromagnetically inductive coil 256, wound around a displaceable armature 248. Electromagnetically inductive coil 256 is shaped such that displaceable armature 248 is readily displaced in and out of the center of electromechanical solenoid 252 altering inductance of electromagnetically inductive coil 256 and thereby becoming an electromagnet. Displaceable armature 248 is geared towards providing a mechanical force to locking mechanism 254.

The force applied to displaceable armature 248 is proportional to the change in inductance of electromagnetically inductive coil 256 with respect to the change in position of displaceable armature 248, and the current flowing through electromagnetically inductive coil 256. The force applied to displaceable armature 248 will displace displaceable armature 248 in a direction that increases the inductance of electromagnetically inductive coil 256.

Component array 250 preferably includes an antenna 270 for transceiving responsively to cellular module 76.

For the purpose of enhancing output and reception levels, antenna 270 is preferably a directional antenna or a horn antenna.

Component array 250 preferably includes at least one interface selected from the group consisting of: a USB interface 258, a PDA interface 262, a cellular interface 264, a memory card interface 266, a computer interface 272 and a control interface 274.

Component array 250 preferably includes a photographic module 299 geared towards capturing still images, clips and video images.

Component array 250 preferably includes an omni-directional antenna 298 for low power transmission.

Component array preferably utilizes drink 18 for cooling at least one component of component array 250.

Drink 18 flows through a cooling mechanism 286. Preferably, a valve mechanism 284 controls the flow of drink 18 through cooling mechanism 286.

Cooling mechanism is geared towards cooling a management module 294, control module 295 and memory unit 296. A cooling exit 297 readily facilitates flow of drink 18 subsequent to drink 18 cooling at least one component of component array 250.

Preferably, a unidirectional valve 285 connects cooling exit 297 and facilitates flow of drink 18 from cooling exit 297 into flow pipe 236.

Preferably, component array 250 is secured to bottled drink container 500 by way of a locking mechanism 231. Locking mechanism 231 is geared towards fitting, replacing and/or recycling, maintenance and re-use of component array 250 in additional bottled drink containers 500.

Management module 294 preferably manages and controls energy consumption of component array 250.

FIG. 3 illustrates a food container 10 includes a food 305. Food container 10 includes a semi flexible floor 50. Preferably, a user inserts an article such as a spoon 52 for the purpose of consuming food 305. Preferably, thereafter spoon 52 displaces flexible floor 50 thereby triggering a pressure switch 316, which pressure switch 316 activates an audio device 54. Audio device 54 plays music, tones or a voice recording via a speaker 56 substantially during, before or after food 305 is consumed.

Preferably, an electronic and projecting unit 20 is electronically attached to or integrally formed with radio device 28 facilitating a user to listen to radio device 28 at will.

Preferably, radio device 28 is preset to a given station according to the intended consumers of food 305 contained in food container 10.

Like above, food container 10 includes a cellular module 76 for readily facilitating a user to use food container 10 as a cellular phone pre-charged with a predetermined value of calls. Thus, cellular module 76 can utilizes earphone jack 32 for readily accommodating earphone plug 34, which earphone plug 34 is attached to, or integrally formed with earphone 36 or earphone set 38. Preferably earphone 36 or earphone set 38 include or are integrally formed with microphone 40 for readily facilitating two-way conversations with cellular module 76. Preferably, food container 10 includes food 305 and a communication module 58. Communication module 58 is preferably selected from the group consisting of, a cellular communication module, a satellite communication module, a Bluetooth communication module, an RF communication module, a local area network communication module an IR communication module and a wired communication module. Communication module 58 preferably readily facilitates communication with a remote apparatus 60.

Preferably, remote apparatus 60 is selected from the group consisting of: a computer, a PDA and a Cell phone.

Preferably, a multimedia module 375 is electronically attached to, or integrally formed with food container 10 such that multimedia module 375 can be remotely activated by a user, thereby inducing a child to consume the contents of food container 10.

Food container 10 includes a food closure 310 and accommodates an electronic and projecting unit 20. When the user uses opens food closure 310 and enters an a article such as spoon 52, into food container 10 is sensed by an entry sensor 251 and optionally operates electronic and projecting unit 20. Optionally, a control module 365 uses images and/or sounds held in a memory unit 380 to project images on a wall 318 of food container 10 and sound voices via speaker 56 for a period of time.

Preferably, control module 365 is electronically attached to or integrally formed with radio device 28 facilitating a user to listen to radio device 28 at will.

Preferably, food container 10 includes an array of photoelectric cells 220 for readily generating power for food container 10.

Preferably control module 365 controls cellular module 76.

Preferably, food container 10 includes a food component array 350. Food component array 350 includes a plunger 330 for readily facilitating displacement by spoon 52 displacing flexible floor 50 and/or activation of components within food component array 350.

Optionally, remote apparatus 60 controls food component array 350.

For the purpose of sealing plunger 330 to an upper surface 282 of food component array 350, food container 10 further includes a plunger conduit 340. Plunger conduit 340 is preferably secured to food container 10 by way of a plunger conduit securer 325.

Optionally, a fiber optic controller 222 is configured to fiber optically control at least one component of food component array 350.

A food activator 316 is activated subsequent to displacing plunger 330.

Preferably, food activator 316 is selected from the group consisting of: a pressure switch, an electrical switch, an electronic switch, a mechanical switch and an acoustic switch.

Like above, food component array 350 includes a compressed hydrogen container 260 for readily providing hydrogen to a fuel cell 280 by way of a gas pipe 232. Preferably, plunger conduit securer 325 readily secures fuel cell 280.

A pressure valve 261 is attached to, or integrally formed with, compressed hydrogen container 260 for readily controlling the pressure and/or quantities of hydrogen flowing from hydrogen container 260 to fuel cell 280.

Optionally, a hydrogen container securing element 228 is provided for securing hydrogen container 260 to food component array 350.

Fuel cell 280 is geared towards an electrochemical conversion. Fuel cell 280 preferably produces electricity from fuel on an anode side 234 and an oxidant on a cathode side 281, which react in the presence of an electrolyte 244. The reactants flow into fuel cell 280, and the reaction products flow out of fuel cell 280 by way of a flow pipe 236, while electrolyte 244 remains within fuel cell 280. Fuel cell 280 preferably operates substantially continuously as long as the flow to anode side 234 and cathode side 281 is maintained.

Fuel cell 280 is selected from the group consisting of an electrochemical cell, at least one battery which at least one battery consumes a reactant from an external source, which must be replenished, a thermodynamically open system, at least one battery storing electrical energy chemically and a thermodynamically closed system.

Preferably and as shown in FIG. 3 as well, fuel cell 280 is a hydrogen fuel cell including hydrogen as its fuel and oxygen from air as its oxidant. Hydrogen flows from hydrogen container 260 to anode side 234 and comes into contact with oxygen flowing from air flowing from outside food container 10 through a filtered aperture 268 formed in food container 10. Air flowing from filtered aperture 268 formed in food container 10 travels through an air pipe 269 to cathode side 281, thereby providing the oxygen as the oxidant.

Alternatively and by way of example only, other usable fuels instead of hydrogen include hydrocarbons and alcohols. By way of example only, other oxidants can include chlorine and chlorine dioxide.

Optionally, a catalyst 242 is situated between anode side 234 and cathode side 281.

Preferably, food container 10 includes a component array closure 290. Preferably, component array closure 290 is secured to drink container by a locking mechanism 254. Locking mechanism 254 is geared toward securing and locking component array closure 290 to food container 10. Preferably, component array closure 290 is readily removable by the manufacturer or filler of food 305 for the purpose of access, refueling fuel cell 280 and maintenance of food component array 350.

By way of an example only, an electromechanical solenoid 252 includes an electromagnetically inductive coil 256, wound around a displaceable armature 248. Electromagnetically inductive coil 256 is shaped such that displaceable armature 248 is readily displaced in and out of the center of electromechanical solenoid 252, altering inductance of electromagnetically inductive coil 256 and thereby becoming an electromagnet. Displaceable armature 248 is geared towards providing a mechanical force to locking mechanism 254.

The force applied to displaceable armature 248 is proportional to the change in inductance of electromagnetically inductive coil 256 with respect to the change in position of displaceable armature 248, and the current flowing through electromagnetically inductive coil 256. The force applied to displaceable armature 248 will displace displaceable armature 248 in a direction that increases the inductance of electromagnetically inductive coil 256.

Food component array 350 preferably includes a multi channel antenna 298 for transceiving responsively to cellular module 76.

Food component array 350 preferably includes at least one interface selected from the group consisting of: a USB interface 258, a PDA interface 262, a cellular interface 264, a memory card interface 266, a computer interface 272 and a control interface 274.

Food component array 350 preferably includes a photographic module 299 geared towards capturing still images, clips and video images.

Preferably, multi channel antenna 298 is an omni-directional antenna for low power transmission.

Component array preferably utilizes food 305 for cooling at least one component of food component array 350.

Cellular module 76 is powered by a power supply selected from the group consisting of: a main power supply 240, a fuel cell 280 and photo electric array 220.

Preferably, food component array 350 is secured to food container 10 by way of a locking mechanism 231. Locking mechanism 231 is geared towards fitting, replacing and/or recycling, maintenance and re-use of food component array 350 in additional food containers 10.

For the purpose of controlling energy output and energy consumption of food component array 350, an energy controller 360 is provided.

For the purpose of remote control of management of food component array 350, a remote controller 370 is provided.

Optionally, flow pipe 236 has a flow reservoir 390 for collection of output from flow pipe 236.

Food component array 350 preferably includes an antenna 270 for transceiving responsively to cellular module 76.

For the purpose of enhancing output and reception levels, antenna 270 is preferably a directional antenna or a horn antenna.

FIG. 4 illustrates array adapter 400 with an audio device 54 geared towards playing music, tunes or voice recordings, via a speaker 56.

Preferably, an electronic and projecting unit 20 is electronically attached to or integrally formed with radio device 28 facilitating a user to listen to radio device 28 at will.

Preferably, radio device 28 is preset to a given station. Array adapter 400 includes a cellular module 76 for readily facilitating a user to use array adapter 400 as a cellular phone pre-charged with a predetermined value of calls. Thus, cellular module 76 can utilizes earphone jack 32 for readily accommodating earphone plug 34, which earphone plug 34 is attached to, or integrally formed with earphone 36 or earphone set 38. Preferably earphone 36 or earphone set 38 include or are integrally formed with microphone 40 for readily facilitating two-way conversations with cellular module 76.

Preferably, array adapter 400 includes a communication module 58. Communication module 58 is preferably selected from the group consisting of: a cellular communication module, a satellite communication module, a Bluetooth communication module, an RF communication module, a local area network communication module an IR communication module and a wired communication module. Communication module 58 preferably readily facilitates communication with a remote apparatus 60.

Preferably, remote apparatus 60 is selected from the group consisting of: a computer, a PDA and a Cell phone.

Preferably, a multimedia module 375 is electronically attached to, or integrally formed with array adapter 400 such that multimedia module 375 can be remotely activated by a user.

Preferably, a control module 365 is electronically attached to or integrally formed with radio device 28 facilitating a user to listen to radio device 28 at will.

Preferably control module 365 controls cellular module 76.

Preferably, array adapter 400 includes an adapter component array 450. Adapter component array 450 includes an external hydrogen supply 430.

For the purpose of sealing external hydrogen supply 430 to an upper surface 282 of adapter component array 450, array adapter 400 further includes an external supply conduit 444. External supply conduit 444 is preferably secured to array adapter 400 by way of an external supply conduit securer 414.

Optionally, a fiber optic controller 222 is configured to fiber optically control at least one component of adapter component array 450.

For the purpose of controlling energy output and energy consumption of adapter component array 450, an energy controller 360 is provided. Energy controller 360 also controls flow of hydrogen through external hydrogen supply 430 by way of a flow controller 428 geared towards controlling flow of hydrogen through external hydrogen supply 430. Like above, adapter component array 450 includes a compressed hydrogen container 260 for readily providing hydrogen to a fuel cell 280 by way of a gas pipe 232. Preferably, an external supply conduit securer 414 readily secures fuel cell 280.

A pressure valve 261 is attached to, or integrally formed with, compressed hydrogen container 260 for readily controlling the pressure and/or quantities of hydrogen flowing from hydrogen container 260 to fuel cell 280.

Preferably, energy controller 360 controls opening and closing pressure valve 261 as well as the quantity of hydrogen passing from compressed hydrogen container 260.

Optionally, a hydrogen container securing element 228 is provided for securing hydrogen container 260 to adapter component array 450.

Fuel cell 280 is geared towards an electrochemical conversion. Fuel cell 280 preferably produces electricity from fuel on an anode side 234 and an oxidant on a cathode side 281, which react in the presence of an electrolyte 244. The reactants flow into fuel cell 280, and the reaction products flow out of fuel cell 280 by way of a flow pipe 236, while electrolyte 244 remains within fuel cell 280. Fuel cell 280 preferably operates substantially continuously as long as the flow to anode side 234 and cathode side 281 is maintained.

Fuel cell 280 is selected from the group consisting of an electrochemical cell, at least one battery which at least one battery consumes a reactant from an external source, which must be replenished, a thermodynamically open system, at least one battery storing electrical energy chemically and a thermodynamically closed system.

Preferably and as shown in FIG. 4 as well, fuel cell 280 is a hydrogen fuel cell including hydrogen as its fuel and oxygen from air as its oxidant. Hydrogen flows from hydrogen container 260 to anode side 234 and comes into contact with oxygen flowing from air flowing from outside adapter component array 450 through a filtered aperture 268 formed in adapter component array 450. Air flowing from filtered aperture 268 formed in adapter component array 450 travels through an air pipe 269 to cathode side 281, thereby providing the oxygen as the oxidant.

Alternatively and by way of example only, other usable fuels instead of hydrogen include hydrocarbons and alcohols. By way of example only, other oxidants can include chlorine and chlorine dioxide.

Optionally, a catalyst 242 is situated between anode side 234 and cathode side 281.

Preferably, adapter component array 450 includes a locking mechanism 254. Locking mechanism 254 is geared toward securing and locking adapter component array 450 to array adapter 400. Preferably, a component array closure 290 is readily removable by the manufacturer or a technician of array adapter 400 for the purpose of access, refueling fuel cell 280 and maintenance of adapter component array 450.

By way of an example only, an electromechanical solenoid 252 includes an electromagnetically inductive coil 256, wound around a displaceable armature 248. Electromagnetically inductive coil 256 is shaped such that displaceable armature 248 is readily displaced in and out of the center of electromechanical solenoid 252, altering inductance of electromagnetically inductive coil 256 and thereby becoming an electromagnet. Displaceable armature 248 is geared towards providing a mechanical force to locking mechanism 254.

The force applied to displaceable armature 248 is proportional to the change in inductance of electromagnetically inductive coil 256 with respect to the change in position of displaceable armature 248, and the current flowing through electromagnetically inductive coil 256. The force applied to displaceable armature 248 will displace displaceable armature 248 in a direction that increases the inductance of electromagnetically inductive coil 256.

Adapter component array 450 preferably includes a multi channel antenna 298 for transceiving responsively to cellular module 76.

Adapter component array 450 preferably includes at least one interface selected from the group consisting of: a USB interface 258, a PDA interface 262, a cellular interface 264, a memory card interface 266, a computer interface 272 and a control interface 274.

Adapter component array 450 preferably includes a photographic module 299 geared towards capturing still images, clips and video images.

Multi channel antenna 298 is preferably an omni-directional antenna for low power transmission.

Cellular module 76 is powered by a power supply selected from the group consisting of: a main power supply 240, a fuel cell 280 and photo electric array 220.

Preferably, adapter component array 450 is secured to array adapter 400 by way of a locking mechanism 231. Locking mechanism 231 is geared towards fitting, replacing and/or recycling, maintenance and re-use of adapter component array 450 in additional adapter component arrays 450.

For the purpose of remote control of management of adapter component array 450, a remote controller 370 is provided.

Preferably, array adapter 400 includes a coupler 410 for readily coupling and/or attaching array adapter 400 to electronic equipment, utility items, food containers, drink containers and the like.

Preferably, array adapter 400 includes an external power supplier 420 for external power supply to at least one component in adapter component arrays 450.

Preferably, array adapter 400 includes an external control channel 440 for the purpose of wired communicating with external components and equipment as well as electronic equipment, utility items, food containers, drink containers and the like.

A unidirectional valve 408 is attached to or integrally formed with external supply conduit 444 for the purpose of controlling flow of hydrogen from external hydrogen supply 430. External supply conduit 444 optionally includes an attachment element 404 for the purpose of attaching and/or securing external supply conduit 444, unidirectional valve 408 and/or external hydrogen supply 430.

Preferably, external supply conduit 444 is attached to, or integrally formed with external control channel 440 by way of a conduit attachment 460. Optionally, external supply conduit 444 includes a control channel link 418 for readily relaying command and control links and/or instructions from external control channel 440 to adapter component array 450.

For the purpose of relaying commands and/instructions to fiber optic controller 222, a fiber optic attachment 480 is attached to, or integrally formed with external supply conduit 444.

For the purpose of relaying power from external power supply 420 to fiber main power supply 240, a power attachment 470 is attached to, or integrally formed with external supply conduit 444.

Preferably, external supply conduit 444 includes a power link 448 for readily relaying power from external power supply 420 to adapter component array 450. Preferably, power link 448 is attached to, or integrally formed with power supply 240 by way of a power attachment 490.

For the purpose of controlling the content of flow reservoir 390 and/or drainage of flow reservoir 390, a drainage pipe 434 is attached to or integrally formed with flow reservoir 390. Preferably, drainage from flow reservoir 390 can be readily controlled upon demand or alternatively can readily facilitate drainage of flow reservoir 390 substantially continuously. Preferably, drainage pipe 434 readily facilitates removal of any material to the exterior of adapter component array 450 by way of a drainage aperture 438 formed in adapter component array 450. Optionally a drainage valve 422 is attached to drainage aperture 438 formed in adapter component array 450 for the purpose of selective drainage of flow reservoir 390.

Optionally, control module 365 uses images and/or sounds held in a memory unit 380.

Preferably, a hydrogen connector 424 connects between unidirectional valve 408 and flow controller 428.

FIG. 5 illustrates a transport container 600 for transporting goods, food, drink and commodities. Preferably, an array adapter 400 of FIG. 4 is attached to, or integrally formed with, transport container for control and management of transport container 600. Like above, array adapter 400 includes an audio device 54 of FIG. 4 geared towards playing music, tunes or voice recordings, via a speaker 56 of FIG. 4.

Preferably, an electronic and projecting unit 20 is electronically attached to or integrally formed with a display 612 of FIG. 5 and a radio device 28 of FIG. 4 facilitating a user to listen to radio device 28 at will.

As shown in FIG. 4, array adapter 400 includes a cellular module 76 for readily facilitating a user to use array adapter 400 as a cellular phone pre-charged with a predetermined value of calls. Thus, cellular module 76 can utilizes earphone jack 32 for readily accommodating earphone plug 34, which earphone plug 34 is attached to, or integrally formed with earphone 36 or earphone set 38. Preferably earphone 36 or earphone set 38 include or are integrally formed with microphone 40 for readily facilitating two-way conversations with cellular module 76.

For the purpose of clarity, array adapter 400 of FIG. 4 is expressly incorporated herein in its entirety by reference thereto.

Energy controller 360 also controls flow of hydrogen through external hydrogen supply 430 by way of flow controller 428 geared towards controlling flow of hydrogen through external hydrogen supply 430. Like above, adapter component array 450 includes a compressed hydrogen container 260 for readily providing hydrogen to a fuel cell 280 by way of a gas pipe 232. Preferably, external supply conduit securer 414 readily secures fuel cell 280.

Preferably, an external hydrogen supply 620 is attached to, or integrally formed with transport container 600. Preferably, an external hydrogen supply valve 605 is controlled by array adapter 400 for controlling the quantity, rate and closure of supply valve 605. Preferably, an attachment pipe 606 connects between hydrogen supply valve 605 and external hydrogen supply 430.

Preferably, transport container 600 includes a first closure 603 and a second closure 604 similarly to transport containers known in the art. Optionally, second closure 604 includes a command panel 610 for readily controlling and displaying telemetry of transport container 600. Preferably, transport container 600 includes at least one telemetry sensor 611 selected from the group consisting of: a temperature sensor, a humidity sensor, a motion sensor, a security sensor, and an integrity sensor. Preferably, command panel 610 includes an access control biometric mechanism 608.

For the purpose of readily facilitating transmission and/or receipt of commands from remote sources, an antenna 601 is attached to, or integrally formed with, transport container 600 and responsive to array adapter 400.

By way of example only, array adapter 400 may be retrofitted to transport containers 600 by way of situating array adapter 400 in upper part 607 of transport container 600.

Alternatively, by way of an additional non limiting example only, array adapter 400 may be retrofitted to transport containers 600 by way of situating array adapter 400 in a compartment 602 formed in first closure 603, thereby readily facilitating retrofitting of transport container 600 by way of replacing first closure 603.

FIG. 6 illustrates a vending machine 88 with a multimedia module 90 for projecting an image or movies viewable on a display 94. Multimedia module 90 is geared towards producing sound, music and audio by way of a speaker 96. Vending machine 88 contains at least one food package 98. Multimedia module 90 is operated according to predetermined criteria e.g., activating vending machine 88, entering payment to vending machine 88 and the like. An electronic unit 100 and a projecting unit 102 project images 104 such that images 104 are viewable and images 104 can be seen from outside of vending machine 88.

Preferably, substantially contemporaneously with electronic unit 100 playing sounds via speaker 96, images 104 or a movie, substantially together with audible music and sound are played during consumption of food package 98 by the user.

Preferably, electronic unit 100 is electronically attached to or integrally formed with a radio device 106 facilitating a user to listen to the radio at will.

Preferably, radio device 106 is preset to a given station according to the intended consumers of the food/drink in vending machine 88.

Preferably, electronic unit 100 is electronically attached to or integrally formed with a radio 106 facilitating a user to listen to radio device 106 at will.

Preferably, radio 106 is preset to a given station according to the intended consumers of food package 98 contained in vending machine 88.

Preferably, vending machine 88 includes a cellular vending module 108 for readily facilitating a user to use a cellular phone to pay for food package 98 by billing the account of the user.

Preferably, vending machine 88 includes a door shaped closure 110 for closing vending machine 88. Preferably, vending machine 88 includes a remote control sub-system 113 for readily facilitating remote access to multimedia module 90, a cooling unit 700 and an array adapter 400.

Preferably, array adapter 400 includes a remote command module 370.

Optionally, a remote apparatus 122 readily controls remote command module 370.

For the purpose of clarity, array adapter 400 of FIG. 4 is expressly incorporated herein in its entirety by reference thereto.

Like above, array adapter 400 includes an adapter component array 450. Adapter component array 450 includes an external hydrogen supply 430.

Optionally, remote apparatus 122 readily controls array adapter 400 of FIG. 4.

Preferably, vending machine 88 includes a communication module 120. Communication module 120 is preferably selected from the group consisting of: a cellular communication module, a satellite communication module, a Bluetooth communication module, an RE communication module, a local area network communication module an IR communication module and a wired communication module. Communication module 120 preferably readily facilitates communication with a remote apparatus 122.

Preferably, remote apparatus 122 is selected from the group consisting of: a computer, a PDA and a Cell phone.

Thus, multimedia module 90 is electronically attached to, or integrally formed with such that vending machine 88 can be remotely activated by a user.

Preferably, vending machine 88 includes an access control biometric mechanism 608 for the purpose of controlling access and/or replenishing or replacement of food packages 98.

Preferably, multimedia module 90 can be used for projecting an image or movies viewable on an outside wall 92. Multimedia module 90 is operated according to predetermined criteria e.g., opening vending machine 88.

Preferably, substantially contemporaneously with electronic unit 100 playing sounds via speaker 96, images 104 or a movie, substantially together with audible music and sound are played during consumption of food package 98 by the user.

For the purpose of readily facilitating transmission and/or receipt of commands from remote sources, an antenna 710 is attached to, or integrally formed with, vending machine 88 and responsive to array adapter 400.

Preferably, an adjustable display mount 720 situates and/or displaces display 94 to a pre-set direction. Alternatively, adjustable display mount 720 is responsive to array adapter 400 to readily control displacement of display 94 to a specific angle or substantially continuously displace display 94.

An illumination source 730 is attached to vending machine 88 and responsive to commands from array adapter 400. By way of a non-limiting example only, illumination source 730 includes and light emitting diodes (LED) matrix 735. Light emitting diodes (LED) matrix 735 is geared towards providing enhanced energy consumption properties and/or providing a plurality of colored illumination schemes.

Door shaped closure 110 preferably includes a handle 740 for readily facilitating of access and/or replenishing or replacement of food packages 98.

A plurality of food package bases 750 are provided for the purpose of situating, storing or securing food packages 98 in vending machine 88.

Preferably, an external vending hydrogen supply 770 is attached to, or integrally formed with vending machine 88. Preferably, an external hydrogen vending supply valve 780 is controlled by array adapter 400 for controlling the quantity, rate and closure of vending supply valve 780. Preferably, an attachment vending pipe 790 connects between hydrogen vending supply valve 780 and external hydrogen supply 430. Optionally, multimedia module 375 is electronically attached to, or integrally formed with vending machine 88 such that multimedia module 375 can be remotely activated by a user, thereby inducing consumption of the contents of vending machine 88. a control module 365 is electronically attached to or integrally formed with radio device 28 facilitating a user to listen to radio device 28 at will.

Preferably control module 365 controls cellular module 76, projecting; unit 102, multimedia module 90, electronic unit 100 and/or radio device 106.

FIG. 7 shows a first drink dispenser 800 which utilizes a drink container 810 for the purpose of dispensing a drink 805. Preferably, drink container 810 attaches to drink dispenser 800 by way of a drink attachment 820. Preferably, drink attachment 820 attaches drink container 810 to drink dispenser 800 according to the methods known in the art for attaching drink containers to drink dispensers.

Similarly to methods known in the art, a drink pipe 802 is provided for readily facilitating transfer of drink 805 from drink container 810 to a dispensing unit 835.

Here as well, array adapter 400 of FIG. 4 is expressly incorporated herein in its entirety by reference thereto. FIG. 7 shows array adapter 400 is preferably connected to dispensing unit 835 for the purpose of controlling and/or supervising dispensing unit 835.

Preferably, a dispensing command panel 850 includes an access control biometric mechanism 608. Preferably, a temperature controlled outlet 860 is geared towards lowering the temperature of drink 805 to a prerequisite temperature. Preferably, an enhanced temperature outlet 865 is geared towards raising the temperature of drink 805 to a prerequisite temperature. Thus, either heated of cooled drinks 805 are readily dispensed by drink dispenser 800.

A drainage system 870 is provided for draining any overflow or spillage of drink 805 according to methods known in the art.

A drainage pipe 804 preferably connects array adapter 400 and drainage system 870. Namely, drainage valve 422 is attached to drainage aperture 438 formed in adapter component array 450 for the purpose of selective drainage of flow reservoir 390 through drainage pipe 804 to drainage system 870.

Here as well, external vending hydrogen supply 770 of FIG. 6 is expressly incorporated herein in its entirety by reference thereto.

External vending hydrogen supply 770 is attached to, or integrally formed with array adapter 400 for the purpose of providing hydrogen to array adapter 400.

Preferably, drink dispenser 800 includes a plurality of indicators 840 for readily indicating proper function of drink dispenser, dispensing, drink, cooling, heating and proper function of array adapter 400.

FIG. 8 shows a second drink dispenser 900 which utilizes an external drink supply 830 for the purpose of dispensing a drink. Preferably, external drink supply 830 attaches to second drink dispenser 900 by way of an external drink attachment 920. Preferably, external drink attachment 920 attaches external drink supply 830 to second drink dispenser 800 according to the methods known in the art for attaching external drink supplies to drink dispensers.

Similarly to methods known in the art, a second drink pipe 902 is provided for readily facilitating transfer of drink from external drink supply 830 to a dispensing unit 835.

Here as well, array adapter 400 of FIG. 4 is expressly incorporated herein in its entirety by reference thereto. FIG. 8 shows array adapter 400 preferably connected to dispensing unit 835 for the purpose of controlling and/or supervising dispensing unit 835.

Here as well, a dispensing command panel 850 includes an access control biometric mechanism 608. Preferably, a temperature controlled outlet 860 is geared towards lowering the temperature of drink to a prerequisite temperature. Preferably, an enhanced temperature outlet 865 is geared towards raising the temperature of drink to a prerequisite temperature. Thus, either heated of cooled drinks are readily dispensed by second drink dispenser 900.

Similarly, a drainage system 870 is provided for draining any overflow or spillage of drink according to methods known in the art.

A second drainage pipe 904 preferably connects array adapter 400 and drainage system 870. Namely, a drainage valve 422 is attached to drainage aperture 438 formed in adapter component array 450 for the purpose of selective drainage of flow reservoir 390 through second drainage pipe 904 to drainage system 870.

Here as well, external vending hydrogen supply 770 of FIG. 6 is expressly incorporated herein in its entirety by reference thereto.

External vending hydrogen supply 770 is attached to, or integrally formed with array adapter 400 for the purpose of providing hydrogen to array adapter 400.

Preferably, second drink dispenser 900 includes a plurality of indicators 840 for readily indicating proper function of drink dispenser, dispensing, drink, cooling, heating and proper function of array adapter 400

Although the invention has been described in conjunction with specific embodiments thereof it is evident that many alternatives, modifications and variations will be apparent to those skilled in the art, accordingly, it is intended to embrace all such alternatives, modifications and variations that fall within the spirit and broad scope of the appended claims.

What is claimed is:

1. A food container with a closure comprising:
- a container body for accommodating food;
- a closure for closing the container;
- at least one sensor selected from the group consisting of:
  - a closure sensor responsive to said closure being partially or totally opened; and
  - an insertion sensor responsive to an article being entered into said container or displacing a semi flexible floor situated in said container;
- a communication module responsive to said at least one sensor;
- a component array comprising a plurality of components;
- a locking mechanism to secure the component array in the container;
- a conduit connected between the container body and the component array;
- a removable component array enclosure in which the component array is held and which is configured to be removable from the container body; and
- an array of photo-electric cells to supply power to the plurality of components, at least the at least one sensor and the communication module.

2. The food container of claim 1, further comprising at least one internet service module responsive to said at least one sensor, wherein said at least one internet service module is configured for readily connecting a mobile device to an internet service provider.

3. The food container of claim 2, further comprising at least one audio device comprising at least one of:
(i) a multimedia module including a speaker; and
(ii) a radio device.

4. The food container of claim 3, further comprising an energy module for readily providing power to at least one of said at least one audio device or at least one said internet service module.

5. The food container of claim 4, wherein said energy module is selected from the group consisting of:

(i) a chargeable battery connected to a power supply;
(ii) a fuel cell chargeable by a fuel reservoir; and
(iii) a solar cell array connected to a chargeable battery.

6. The food container of claim 1, wherein the communications module comprises at least one audio device, and is selected from the group consisting of: a cellular communication module, a satellite communication module, a Bluetooth communication module, an RF communication module, a local area network communication module an IR communication module and a wired communication module.

7. The food container of claim 1, wherein the container body comprises a flexible floor; and wherein said plunger conduit comprises:

a plunger disposed under the flexible floor configured to be depressed when the flexible floor is pushed toward the component array; and a conduit securer comprising:

an activator connected between the plunger and the component array to activate at least one of the plurality of components responsive to being activated by depression of the plunger;

a fuel cell for supplying power;

a main power supply;

a fiber optic controller to fiber optically control at least one component of the plurality of components in the component array;

a compressed hydrogen container connected to an input of the fuel cell;

a flow pipe comprising a first end and a second end, the first end being connected to an output of the fuel cell; and a flow reservoir connected to the second end of the flow pipe.

8. The food container of claim 7, wherein said component array component array closure has an upper surface comprising:

a locking mechanism having arms configured to be locked on the conduit securer;

a management module which manages the at least sensor, the main power supply, the array of photo-electric cells, the activator, the fuel cell; an electromagnetically inductive coil; and a pressure valve on the compressed hydrogen container;

a control module which manages a multimedia module, an internet service module, the communications module, the fiber optic controller, a projecting unit, a Bluetooth communication module, an R.F communication module, an I.R communication module, a wired communication module, a local area network communication module, a radio device, an omni-directional antenna, a cellular module, an antenna, a satellite communication module, and an interface for input/output connections;

a memory unit containing image, video, graphics and sound files and other information from the interface input/output connections and the photographic module.

9. The food container of claim 8, wherein said communications module further comprises the internet service module responsive to opening said drink container, the internet service module configured for connecting a mobile device to an internet service provider.

10. The food container of claim 8, wherein said communications module is selected from the group consisting of a cellular communication module, a satellite communication module, a Bluetooth communication module, an RF communication module, a local area network communication module, a remote apparatus, an IR communication and control module; and a wired communication module.

11. The food container of claim 1, wherein said a main power supply for readily providing power is selected from the group consisting of: a fuel cell; a chargeable battery; and an external power through a USB interface.

12. A drink container comprising:

a container body for accommodating drink;

a closure for closing the container;

a sensor for sensing opening of the container;

a communications module responsive to said sensor;

a component array comprising a plurality of components;

a locking mechanism to secure the component array in the container;

a conduit connected between the container body and the component array;

a removable component array enclosure in which the component array is held and which is configured to be removable from the container body; and an array of photo-electric cells to supply power to the plurality of components, at least the sensor and the communication module.

13. The drink container of claim 12, wherein said communications module further comprises an internet service module responsive to opening said drink container, the internet service module configured for connecting a mobile device to an internet service provider.

14. The drink container of claim 13, wherein said communications module readily facilitates communication with a remote apparatus.

15. The drink container according to claim 14, wherein said remote apparatus is selected from the group consisting of: a computer, a PDA, a Cell phone and a vending machine.

16. The drink container of claim 12, wherein said communications module is selected from the group consisting of: a cellular communication module, a satellite communication module, a Bluetooth communication module, an RF communication module, a local area network communication module an IR communication module and a wired communication module.

17. A container for holding foodstuffs, comprising:

a sensor for sensing use of said container;

a component array comprising;

an antenna;

at least one interface for connecting with external components; and an energy module for supply power to at least one component;

a locking mechanism to secure the component array in the container;

a component array comprising a plurality of components;

a conduit connected between the container body and the component array;

a removable component array enclosure in which the component array is held and which is configured to be removable from the container body; and an array of photo-electric cells to supply power to the plurality of components, at least the sensor and a communication module.

18. The container according to claim 17, wherein the at least one interface is selected from the group of a USB interface, a PDA interface, a cellular interface, a memory card interface, a computer interface and a control interface.

19. The container according to claim 17, wherein said energy module is selected from the group consisting of:

(i) a chargeable battery connected to a power supply;
(ii) a fuel cell chargeable by a fuel reservoir; and
(iii) a solar cell array connected to a chargeable battery.

20. The container according to claim 19, wherein said fuel cell is a hydrogen fuel cell including hydrogen as a fuel and oxygen from air as an oxidant, said fuel cell comprising a hydrogen container storing hydrogen on an anode side of the fuel cell, an air pipe for transporting the air from outside of the container through a filtered aperture to a cathode side of the fuel cell.

21. The container according to claim 20, further comprising a catalyst situated between the anode side and the cathode side of the fuel cell.

22. The container according to claim 17, further comprising a cellular module for permitting cellular communications via the container.

23. The container according to claim 17, wherein said component array comprises a photographic module for capturing still images, clips and video images.

24. The container according to claim 17, wherein the container is a drink container selected from the group of a can or bottle, and further comprises a body for accommodating drink, and a closure for closing the container, and wherein the sensor senses opening of the container.

25. The container according to claim 24, further comprising a cooling mechanism for cooling components in the component array, a first valve for controlling flow of a liquid through the cooling mechanism, a cooling exit through which the liquid passes after flowing through the cooling mechanism, and a second valve for control flow of the liquid through the cooling exit.

26. The container according to claim 24, further comprising a communications module responsive to said sensor and comprising an internet service module responsive to opening said drink container, the internet service module configured for connecting a mobile device to an internet service provider.

27. The container according to claim 26, wherein said communications module is selected from the group consisting of: a cellular communication module, a satellite communication module, a Bluetooth communication module, an RF communication module, a local area network communication module an IR communication module and a wired communication module.

28. The container according to claim 26, wherein said communications module readily facilitates communication with a remote apparatus.

29. The container according to claim 28, wherein said remote apparatus is selected from the group consisting of: a computer, a PDA, a Cell phone and a vending machine.

30. The container according to claim 17, wherein the container is a food/drink vending machine comprising a plurality of basis for food packages, at least one food package, wherein each of the at least one food packages associated with a base selected from the plurality of bases, and a communication module responsive to the at least one sensor.

31. The container according to claim 30, wherein said food vending machine further comprises a cooling unit for controlling the temperature of said at least one food package.

32. The container according to claim 30, wherein said communication module comprises at least one module selected from the group consisting of: a multimedia module, a radio module; a biometric module, a cellular module and an internet service modules responsive to activation of said vending machine.

33. The container according to claim 17 wherein in the container comprises a drink dispenser for dispensing drinks to individuals, comprising a dispensing mechanism for readily dispensing drinks, and a communication module responsive to the at least one sensor and selected from the group consisting of: a cellular communication module, a satellite communication module, a Bluetooth communication module, an RF communication module, a local area network communication module an IR communication module and a wired communication module.

34. The container according to claim 33, wherein said dispensing mechanism further comprises a water supply selected from the group consisting of: a water reservoir and a domestic water supply.

35. The container according to claim 33, wherein said communications module comprises a module selected from the group consisting of: a multimedia module, a radio module; a cellular module and an internet service modules responsive to activation of said vending machine.

36. The container according to claim 17, wherein the container comprises a transport container comprising a body for accommodating goods, the closure for closing the container and a communication module for readily communicating readings of said telemetry sensor, said communications module selected from the group consisting of: a cellular communication module, a satellite communication module, a Bluetooth communication module, an RF communication module, a local area network communication module, an IR communication module and a wired communication module, and where in the sensor comprises at least one telemetry sensor selected from the group consisting of: a temperature sensor, a humidity sensor, a motion sensor, a security sensor, and an integrity sensor.

37. The container of claim 36, further comprising at least one mechanism selected from the group consisting of: a cooling mechanism and an access control biometric mechanism.

* * * * *